United States Patent [19] [11] Patent Number: 5,799,376
Harsley [45] Date of Patent: Sep. 1, 1998

[54] TIE STRIPS

[76] Inventor: Andrew John Harsley, 41 Staines Hill, Strurry, Canterbury, Kent GT2 0ER, Great Britain

[21] Appl. No.: 765,560
[22] PCT Filed: Jun. 23, 1995
[86] PCT No.: PCT/GB95/01487
§ 371 Date: Mar. 3, 1997
§ 102(e) Date: Mar. 3, 1997
[87] PCT Pub. No.: WO96/00176
PCT Pub. Date: Jan. 4, 1996

[30] Foreign Application Priority Data

Jun. 24, 1994 [GB] United Kingdom ............. 9412759

[51] Int. Cl.$^6$ ............. B65D 63/10; A01G 17/08
[52] U.S. Cl. ............. 24/16 PB; 24/17 AP; 24/30.5 R; 24/16 R
[58] Field of Search ............. 24/16 DB, 16 R, 24/17 AP, 17 R, 300–302, 115 L, 129 B, 129 R, 30.5 R, 30.5 P

[56] References Cited

U.S. PATENT DOCUMENTS

| | | | |
|---|---|---|---|
| 3,438,095 | 4/1969 | Evans | 24/16 PB |
| 3,913,178 | 10/1975 | Ballin | 24/30.5 R X |
| 4,150,463 | 4/1979 | Brown | 24/16 PB |
| 4,377,872 | 3/1983 | Daniell, Jr. | 24/16 PB |
| 4,466,159 | 8/1984 | Burrage | 24/16 PB |

FOREIGN PATENT DOCUMENTS

| | | | |
|---|---|---|---|
| 0 389831B1 | of 0000 | European Pat. Off. | |
| A 295753 | of 0000 | European Pat. Off. | |
| 1287485 | 2/1962 | France | 24/16 PB |
| 1439115 | 3/1966 | France | 24/16 PB |
| 1226687 | 4/1986 | France | 24/16 PB |
| A-2524013 | of 0000 | Germany | |
| 753420 | 10/1951 | Germany | 24/16 PB |
| 1278571 | 10/1961 | Germany | 24/16 PB |

*Primary Examiner*—Randolph A. Reese
*Assistant Examiner*—Robert J. Sandy
*Attorney, Agent, or Firm*—Kirkpatrick & Lockhart LLP

[57] ABSTRACT

An integrally formed tie strip (10) is formed with a series of apertures (14), at respective locations that are spaced apart in succession along the strip, and is formed with a series of laterally projecting latch members (11), at respective locations that are spaced apart in succession along the strip, for resisting withdrawal from one of the said apertures after having been passed therethrough.

10 Claims, 9 Drawing Sheets

TIE STRIPS

FIELD OF THE INVENTION

The present invention relates to tie strips, for example cable ties.

DESCRIPTION OF THE INVENTION BACKGROUND

Tie strips are used to secure items together in a relatively quick and easy manner. For example, tie strips can be used to bundle cables together laterally, or to secure a tree to a stake.

One conventional tie strip is generally in the form of a length of flexible material having an apertured head portion, at one end, and a tail portion which can be passed through the aperture of the head portion and has a series of laterally projecting latch portions for preventing withdrawal from the said aperture. In use, the tie strip is placed around the items to be secured and the tail portion is inserted into the aperture of the head portion. The tail portion is then pulled through the head portion to tighten the tie strip around the enclosed items. The latch portion(s) cooperate with the head portion in the manner of a ratchet, permitting such tightening of the strip, in the form of a closed loop, and preventing it from becoming loose thereafter.

One disadvantage of such a tie strip is that the part of the tail that has been pulled through the head is wasted material.

An alternative form of tie strip is known from DE 25 24 013. This tie strip comprises a series of unit cell portions, each including a relatively small rectangular aperture and one or more latch members. In order to form a closed loop, the unit cell portion at a first end of the tie strip is introduced to the aperture of a predetermined unit cell, and the first end of the strip pulled tightly so that the tie strip with its latch members passes in a ratchet-like manner through the aperture. This form of tie strip avoids the waste inherent in the previously-discussed tie strip, but still presents disadvantages because a relatively large tension is required to force the unit cell portions of the tie strip through the aperture of the predetermined unit cell, which is of rectangular shape with a constant spatial area. Furthermore, the first end of the tie strip must be twisted through 90° in order to pass through the aperture, and must then be twisted back in order to lock the tie strip around the cables to be tied.

SUMMARY OF THE INVENTION

According to the present invention there is provided an integrally formed tie strip, made of a semi-rigid resiliently bendable material, comprising a series of unit cell portions connected one to the next along the strip, each of the said unit cell portions being formed to define at least one latch member projecting laterally of the strip's longitudinal axis, and to define an aperture through the strip, characterised in that the aperture of each unit cell portion is bounded on at least one side by a spring portion formed by parts of the strip that extend transversely with respect to the said longitudinal axis, the spring portion being resiliently deformable so as to enable the shape of the aperture to be changed, wherein a first unit cell portion of the strip can be passed through the aperture of a second unit cell portion of the strip so as to form a closed loop by way of the spring portion of the first and/or the second unit cell portion being deformed such that the shape of the aperture of the first and/or the second unit cell portion is respectively changed to a non-affine shape upon relative passage of the unit cell portions, and wherein the spring portion of the first and/or the second unit cell portion relaxes after said passage so that the at least one latch member of the said first unit cell portion inhibits withdrawal thereof from the aperture of the said second unit cell portion.

Because each unit cell portion has an aperture of variable area and shape, which area and shape may easily be changed by deforming the spring portion, relatively little force is required when pulling a first end of the tie strip through the aperture of a predetermined unit cell portion. In addition, it is not necessary to twist the first end of the tie strip in order to effect passage through the aperture, nor is it necessary to twist the tie strip back again in order to bring the latch member or members into operation.

It is to be noted when the spring portion is deformed so as resiliently to change the shape of the aperture from a first shape to a second shape, the first and second shapes are not affine. In other words, the shape transformation does not preserve parallel lines.

A preferred embodiment of such a strip is made of a semi-rigid resiliently bendable material, and is provided with a series of spring portions, at respective locations that are spaced apart in succession along the strip, formed by parts of the strip that extend transversely with respect to its longitudinal axis, whereby resilient bending of the said parts when the strip is subjected to an applied longitudinal tension affords resilient longitudinal extension of the strip.

In the stretched condition the strip portion formed to define a selected one of the said latch members at one end region of the strip can be passed through a selected one of the said apertures so as to form a closed loop whereafter on relaxation of the applied tension the loop will tend to contract whilst the selected latch member prevents withdrawal thereof from the selected aperture.

Alternatively, this strip portion formed to define a selected one of the said latch members at one end region of the strip can be passed through a selected one of the said apertures so as to form a closed loop in an unstretched condition.

In such a preferred embodiment the said portions defining the latch members may be separate from the said portions defining the apertures and from the said spring portions, the said spring portions being separate from the said portions defining the apertures.

Alternatively, the said portions defining the apertures may comprise the respective said portions defining the latch members.

In another alternative form, the said portions defining the apertures comprise the respective said spring portions.

In a further alternative form, the said spring portions comprise the respective said portions defining the latch members.

An advantageous form of the preferred embodiment of the present invention consists of a strip comprising a series of unit cell portions connected one to the next along the strip, each of the said unit cell portions being formed to define at least one of the said latch members and to define one of the said apertures and to provide one of the said spring portions.

The aperture of each unit cell portion in a relaxed condition thereof may have one or more relatively narrow portions that extend transversely across the strip, in a main plane thereof, so that application of longitudinal tension to the strip causes the aperture to open up longitudinally of the strip so as to facilitate the passage therethrough of another such unit cell portion of the strip.

Each of the said unit cell portions is preferably generally cardioid in form and includes an aperture of similar shape, when the strip is free of longitudinal tension, having at one end thereof a re-entrant part and having at the other end thereof an apical part connected, except at the said one end of the strip, to a central region of the re-entrant part of the next unit cell portion in the series, whereby respective lobe portions of each unit cell portion, which lobe portions are located to opposite sides of the said central region of the unit cell portion, provide respective such latch members.

Alternatively each of the said unit cell portions may have the general form of an isosceles triangle and includes an aperture of similar shape, a mid-portion of each of the sides of which is displaced inwardly of the triangle so as to be concave outwardly thereof when the strip is free of longitudinal tension, the apex of each of the said unit cell portions, except that at the said one end of the strip, being connected to the mid-point of the base of the next unit cell portion of the series, whereby respective portions of the triangle adjacent to the base angles thereof provide respective such latch members that are barb-like in form.

BRIEF DESCRIPTION OF THE DRAWINGS

Reference will now be made, by way of example, to the accompanying drawings, in which.

Figure 1:
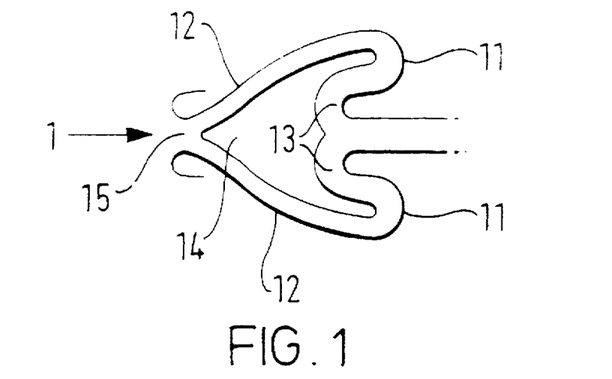
FIG. 1 shows a plan view of part of a tie strip embodying the present invention.
Figure 2:
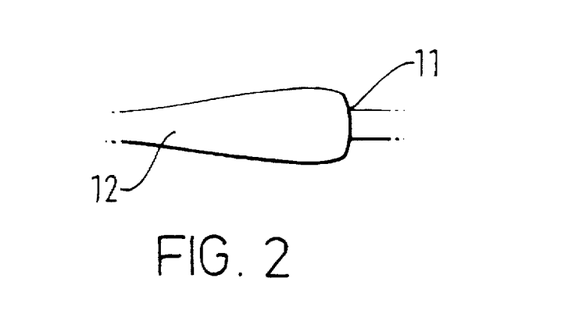
FIG. 2 shows a side elevational view of the part illustrated in FIG. 1.
Figure 3:
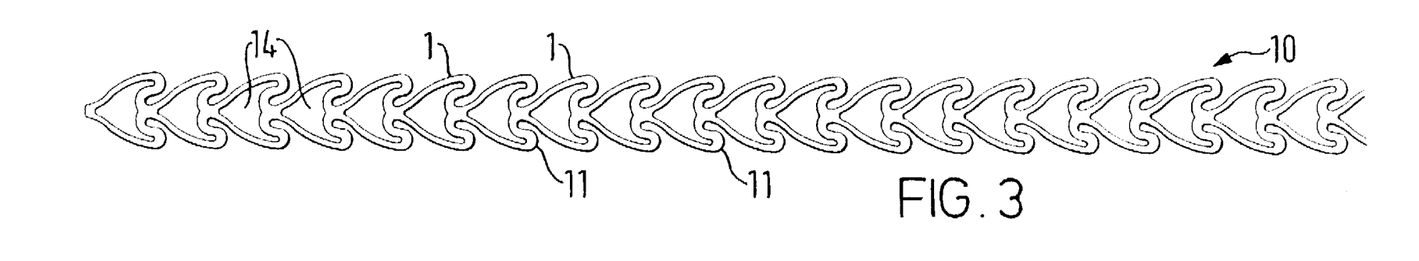
FIG. 3 shows, to a smaller scale, a plan view of a length of the tie strip of FIG. 1.
Figure 4:
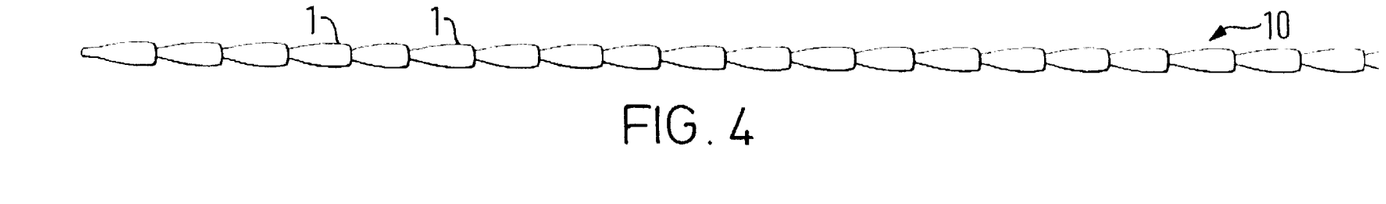
FIG. 4 shows a side elevational view corresponding to FIG. 3.
Figure 5:
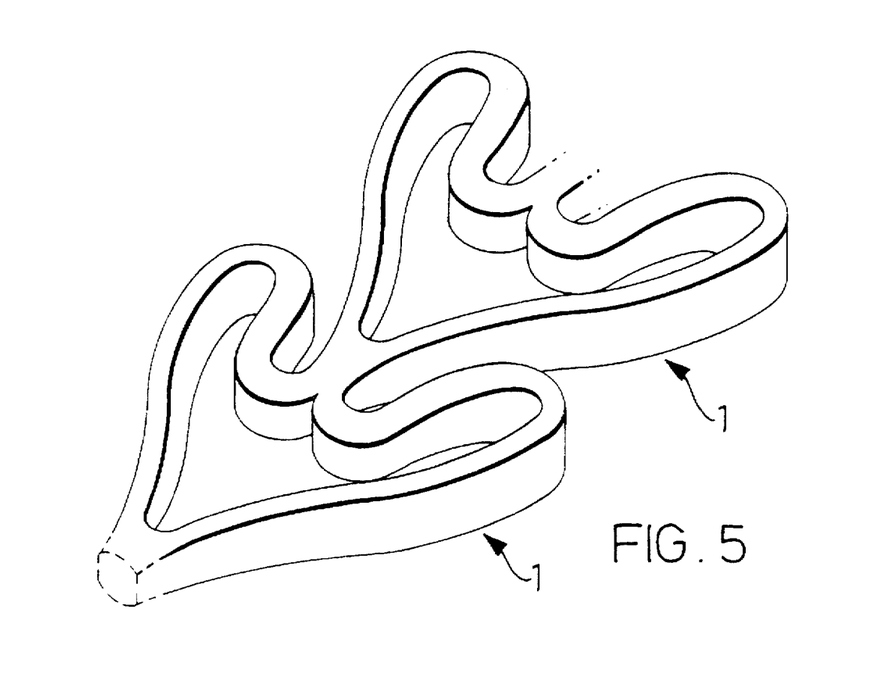
FIG. 5 shows, to an enlarged scale, a diagrammatic isometric view of part of the tie strip of FIG. 3.

FIGS. 1 and 2 show a single unit cell portion 1 of the tie strip of FIGS. 3 and 4. Two such unit cell portions 1 are shown in FIG. 5.

DETAILED DESCRIPTION OF THE PREFERRED EMBODIMENTS

The unit cell portion 1 is generally cardioid in form, when the tie strip in which it is incorporated is free of longitudinal tension. Accordingly, the unit cell portion 1 has a re-entrant part 13 joined to an apical part 15 by opposite side parts 12, which parts bound an aperture 14 passing through the unit cell portion. To opposite sides respectively of the re-entrant part 13 are two lobe portions 11 of the unit cell portion 1, which lobe portions provide respective latch members directed away from the apical part 15 of the unit cell portion 1.

A multiplicity of such unit cell portions 1 are connected together in series to form a generally flat tie strip 10 shown in FIGS. 3 and 4, the apical part 15 of each unit cell portion (except that at the extreme left-hand end of the strip as viewed in FIG. 3) being connected to a central region of the re-entrant part 13 of the next unit cell portion 1 of the series.

Figure 6:
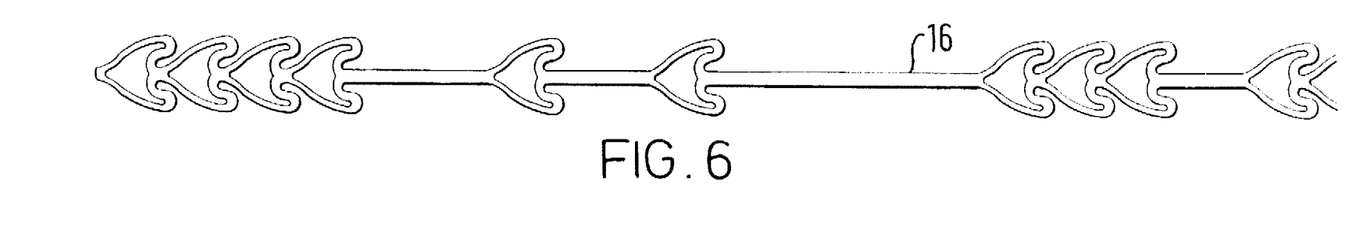
FIG. 6 shows a plan view of a length of tie strip according to a second embodiment of the present invention.
Figure 7:
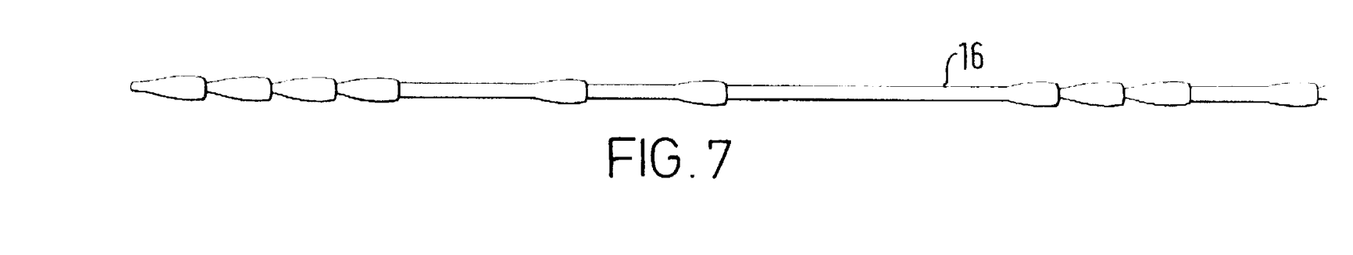
FIG. 7 shows a side elevational view corresponding to FIG. 6.

Alternatively, there may be straight parts 16 of the strip between two such unit cell portions 1, as shown in FIGS. 6 and 7. These straight parts 16 are used to provide an increased length of strip without the need to provide more unit cell portions than is necessary for the particular application for which the tie strip is to be used.

The tie strips shown in FIGS. 3 to 7 are made of a semi-rigid resiliently bendable material. They are formed integrally, for example by injection moulding of a thermosetting or thermoplastic material or by stamping from a blank. More specifically, for example, the strip could advantageously be made of Nylon 66, or of a polyamide derivative, or alternatively of steel or even titanium.

The dimensions of the unit cell portions and the length of an integrally formed tie strip consisting of such portions will vary in dependence upon the application for which the tie strip is to be used. Typically, such a unit cell portion used in a Nylon tie strip for securing cables would desirably be about 8 mm in length, approximately 8 mm in width and between 2 mm and 3 mm in thickness. Such unit cell portions could advantageously be used to produce a tie strip having a length between 0.5 m and 1 m. Such a length of tie strip is preferably stored in the form of a roll. When a tie strip is required for use, an appropriate amount can be cut from the roll.

Figure 8:
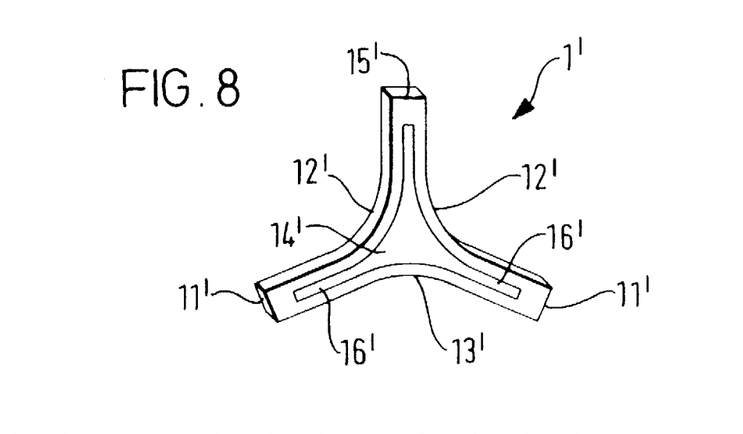
FIG. 8 shows a diagrammatic perspective view of part of a tie strip according to a third embodiment of the present invention.

An alternative form of unit cell portion is shown in FIG. 8. This unit cell portion 1' has the general form of an isosceles triangle, a mid-portion of each of the sides of which is displaced inwardly of the triangle so that these sides are concave outwardly of the triangle when the tie strip incorporating the unit cell portion 1' is free of longitudinal tension. Base angle portions 11' of the triangle provide barb-like latch members. Such a tie strip 10', having a longitudinal axis 100, is shown in FIGS. 9(a) and 9(b), being made up of a series of these unit cell portions 1', the apex 15' of each of which, except that at one end of the strip, is connected to the mid-point of the base 13' of the next unit cell portion in the series.

Parts of each unit cell portion 1', for example the base 13', extend transversely with respect to the longitudinal axis 100 of the strip concerned, thereby providing the strip with a series of spring portions, at respective locations that are spaced uniformly apart in succession along the strip, so that resilient bending of the parts concerned can afford resilient longitudinal extension of the strip when it is tension longitudinally.

Figures 9A, 9B:
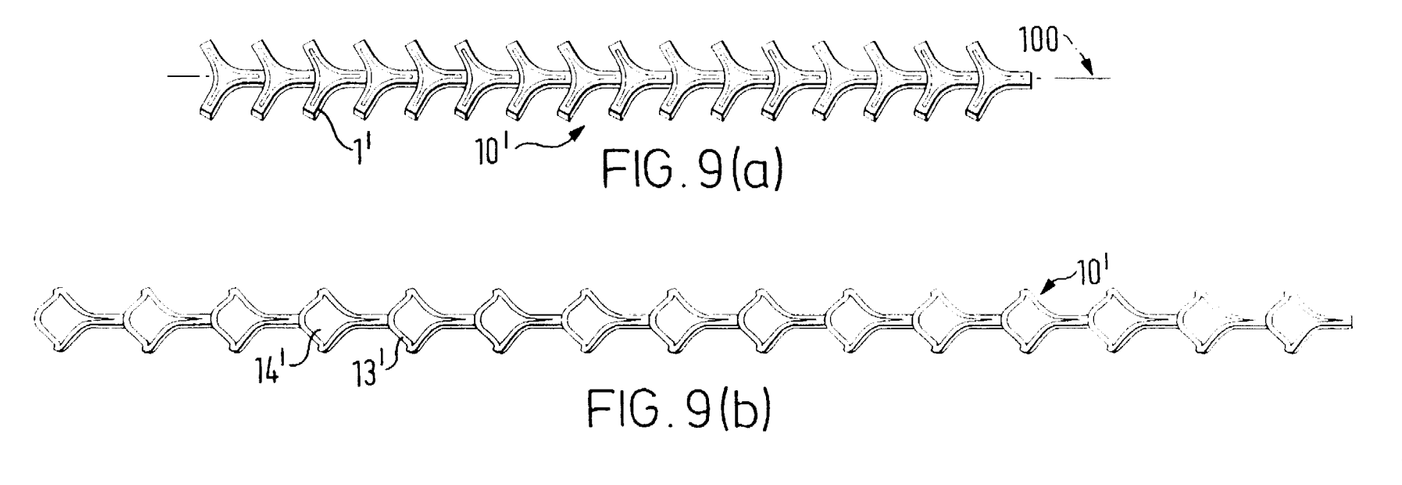
FIGS. 9(a) and 9(b) show, to a smaller scale, a length of the tie strip of FIG. 8, in relaxed and tensioned states respectively.

FIGS. 9(a) and 9(b) show the generally flat strip 10' in a relaxed and a tensioned state respectively. The aperture 14' of the unit cell portion 1', in its relaxed state, has relatively narrow portions 16' (FIG. 8) that extend transversely across the strip, in the main plane thereof, so that application of longitudinal tension to the strip causes the aperture to open up longitudinally of the strip, thereby facilitating the passage therethrough of another such unit cell portion of the strip. Thus, as can be seen from FIG. 9(b), when the strip is subjected to longitudinal tension the base 13' of each unit cell portion 1' is deformed resiliently so as to curve outwardly thereof, thereby opening up the aperture 14'.

It will be appreciated that similar resilient deformation occurs in the unit cell portion 1 of the strip 10 shown in FIG. 3, when that strip is subjected to an externally applied longitudinal tension, although in this case the re-entrant part 13 of the unit cell portion 1 will merely tend to straighten, rather than bow outwardly like the base parts 13' shown in FIG. 9(b).

Figure 10:
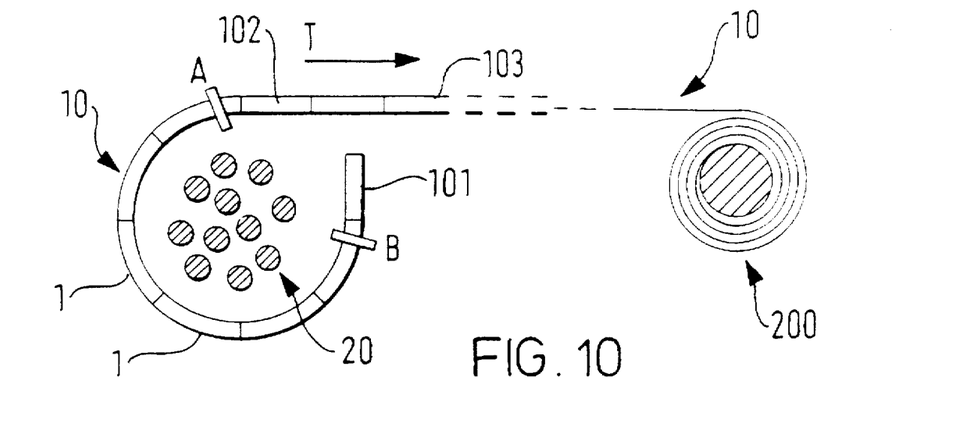
FIGS. 10 and 11 show side views of a tie strip, embodying the present invention, at successive respective stages of an operation to secure a bundle of wires (shown in cross-section) by means of the tie strip.

The tie strip 10 can be used as follows to secure together laterally a bundle of cable wires 20 shown diagrammatically in cross-section in FIGS. 10 and 11. As shown in FIG. 10, a suitable length of tie strip 10 is first pulled from a roll thereof (shown diagrammatically at 200) and looped around the wires 20. The strip is held at points A and B thereon, either manually or by means of a tool. At this stage, the unit cell portions 1 are in a relaxed state as shown in FIG. 3. The unit cell portion held at point A is then pulled in the direction of arrow T, thereby subjecting the unit cell portions of the strip 10 that are located between points A and B to a longitudinal tension. This opens up the apertures (14) in these unit cell portions and moves the point A of the strip to a position A' shown in FIG. 11. The holding point A is then relocated to a point further along the strip towards point B with the aid of an optional holding point C. This process is repeated until the tie strip is tensioned to a desired amount. A unit cell portion 101 at a free end of the tie strip remains in a relaxed state.

Figure 11:
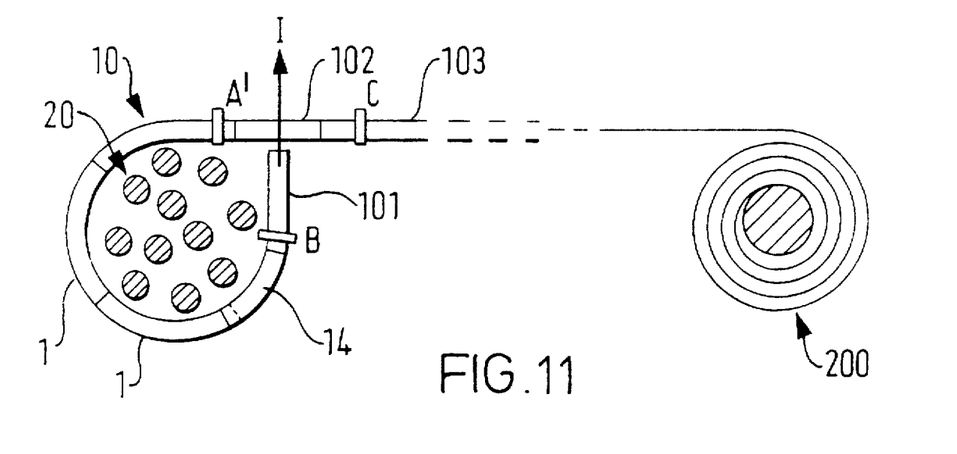

To latch the tie strip 10 into a closed loop, so as to hold the enclosed wires together, the end unit cell portion 101 is inserted into a selected relaxed (untensioned) unit cell portion 102 in the direction shown by the arrow I in FIG. 11. As will be appreciated from FIG. 11, the strip 10 does not have to be twisted about its longitudinal axis as the insertion is made. The grips on the strip 10 at points A and B are then released, and the resilience of the strip material acts to tighten the strip around the wires as the strip tries to return to its relaxed condition. The latch members (11) of the unit cell portion 101 resist withdrawal of that unit cell portion from the unit cell portion 102.

With the tie strip thus secured around the wires 20, a residual part 103 of the strip can be cut off at or near the point A' and wound back onto the roll 200. The severed residual part of the strip can be used for another such securing operation, so waste is minimized.

It will be appreciated that the tie strip 10' of FIG. 9(a) can be used in a similar manner. The unit cell at a free end of the strip being passed through the selected unit cell when that selected unit cell is in a tensioned (opened-up) condition.

Figures 12A, 12B:
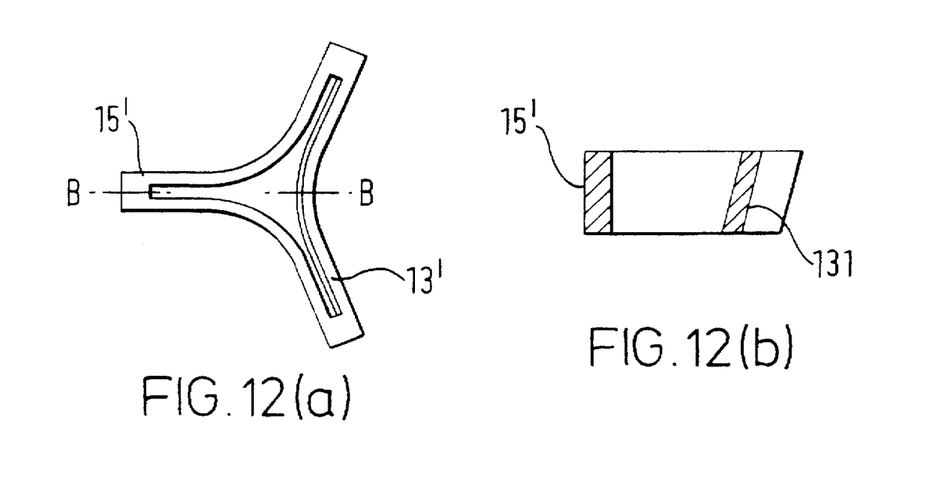
FIG. 12(a) shows a plan view of a part of a first modified form of the tie strip of FIG. 8.
FIG. 12(b) shows a sectional view corresponding to the line B—B of FIG. 12(a)
Figure 13:
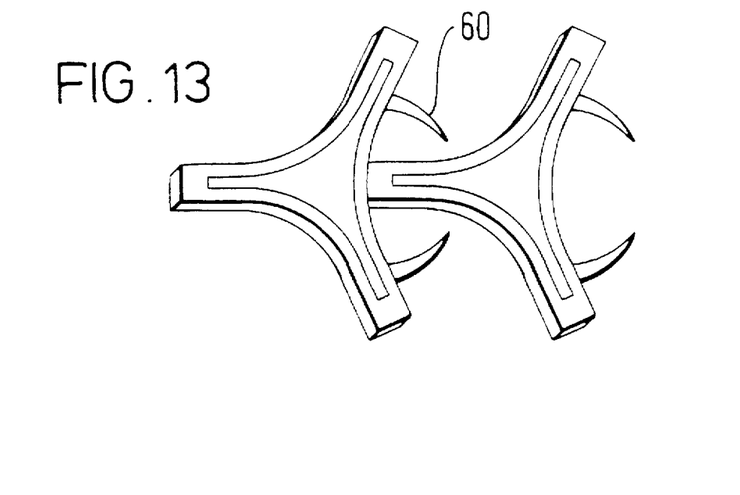
FIG. 13 shows a diagrammatic perspective view of part of a second modified form of the tie strip of FIG. 8.
Figure 14A:
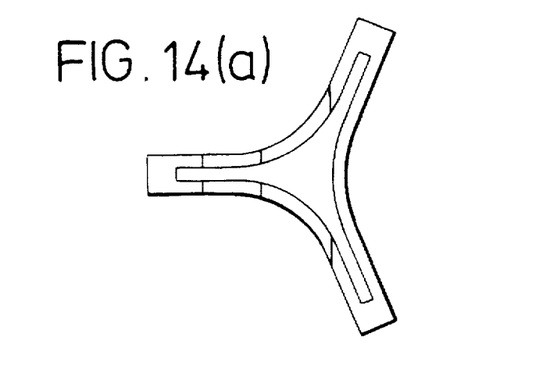
FIG. 14(a) shows a plan view of a part of a third modified form of the tie strip of FIG. 8.
Figure 14B:
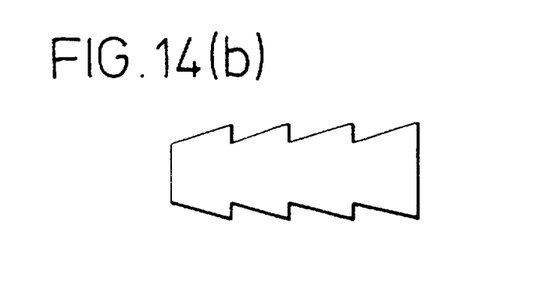
FIG. 14(b) shows a side elevational view corresponding to FIG. 14(a)

FIGS. 12, 13 and 14 show possible modifications to the unit cell portion 1' of FIG. 8.

The unit cell portion shown in FIGS. 12(a) and 12(b) has an oblique rear end surface 131 to aid latching.

FIG. 13 shows two unit cell portions, the base 13' of each of which is formed with rearwardly projecting horns 60, to aid latching.

FIGS. 14(a) and 14(b) show a unit cell portion having serrated surfaces which can facilitate the tensioning process.

Similar modifications could be made to the unit cell portion 1 of FIGS. 1 to 5.

Figure 15A:
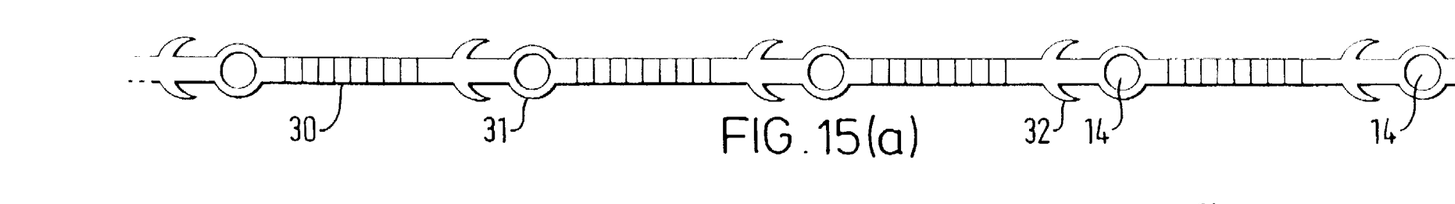
FIGS. 15(a) and 15(b) show respective plan and side elevational views of a tie strip according to a fourth embodiment of the present invention.

FIGS. 15(a) and (b) and 16(a) and (b) show tie strips having resiliently bendable zig-zag spring portions 30 provided separately from portions 31 defining apertures, and from portions 32 defining barb-like latch members.

Figure 15B:
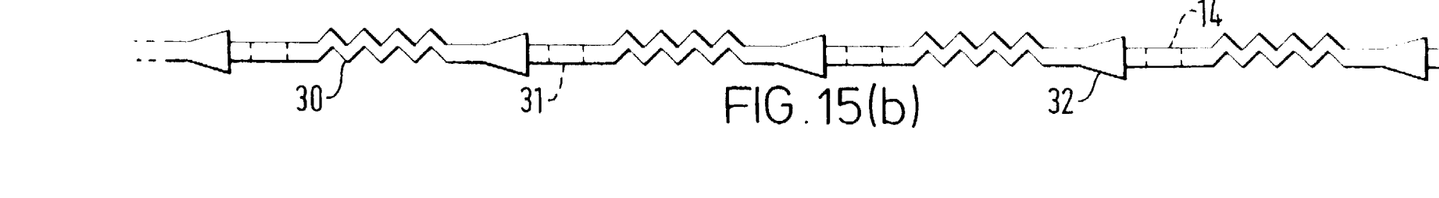
Figure 16A:
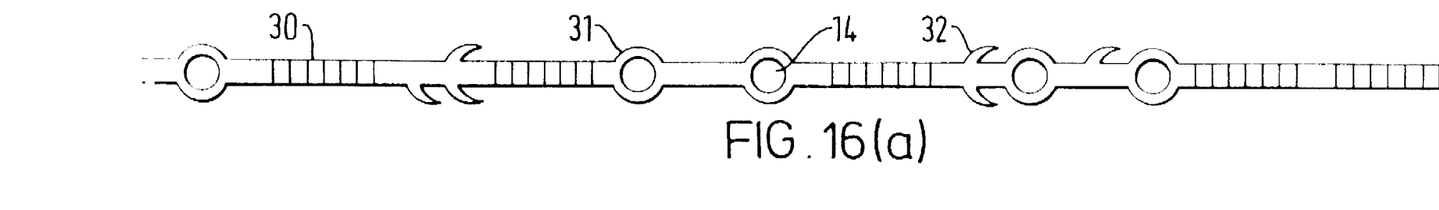
FIGS. 16(a) and 16(b) show respective plan and side elevational views of a tie strip according to a fifth embodiment of the present invention.
Figure 16B:
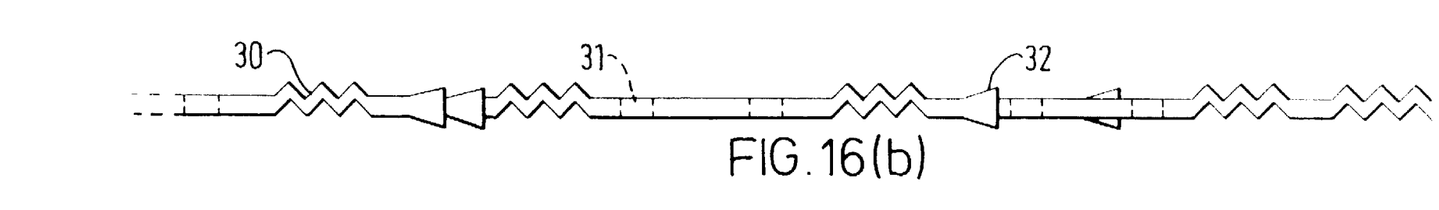

The tie strip shown FIGS. 15(a) and 15(b) comprises a regular sequence of these portions 30, 31 and 32, while the tie strip shown in FIGS. 16(a) and 16(b), comprises an irregular sequence of such portions.

Figures 17A, 17B:
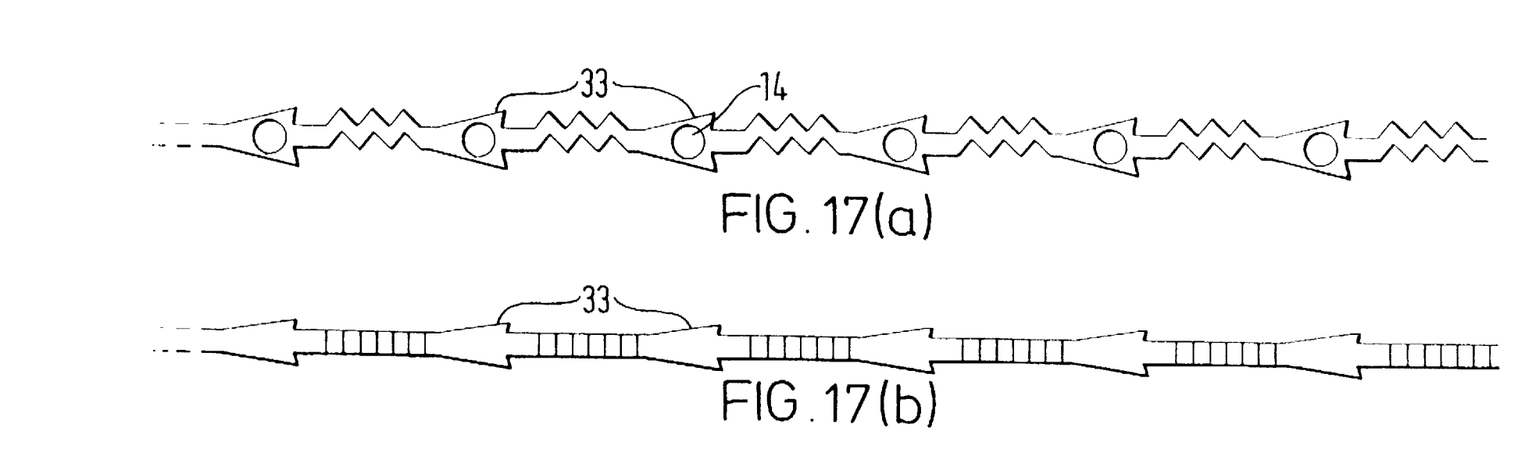
FIGS. 17(a) and 17(b) show respective plan and side elevational views of a tie strip according to a sixth embodiment of the present invention.

FIGS. 17(a) and (b) and 18(a) and (b) show tie strips having resiliently bendable zig-zag spring portions 30 provided separately from portions 33 defining both apertures and barb-like latch members.

Figure 18A:
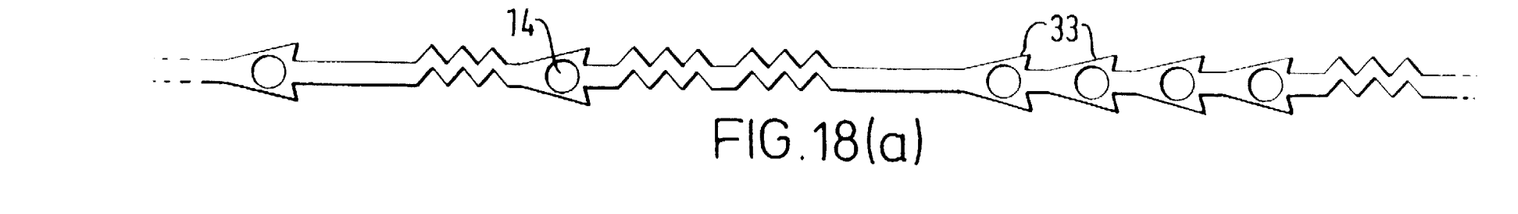
FIGS. 18(a) and 18(b) show respective plan and side elevational views of a tie strip according to a seventh embodiment of the present invention.
Figure 18B:
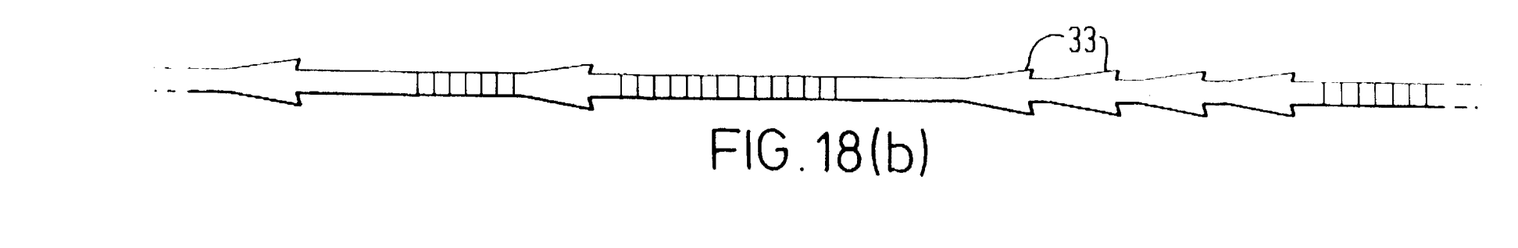

FIGS. 17(a) and 17(b) show a tie strip comprising a regular sequence of such portions 30 and 33, and FIGS. 18(a) and 18(b) show an irregular sequence of such portions.

Figures 19A, 19B:
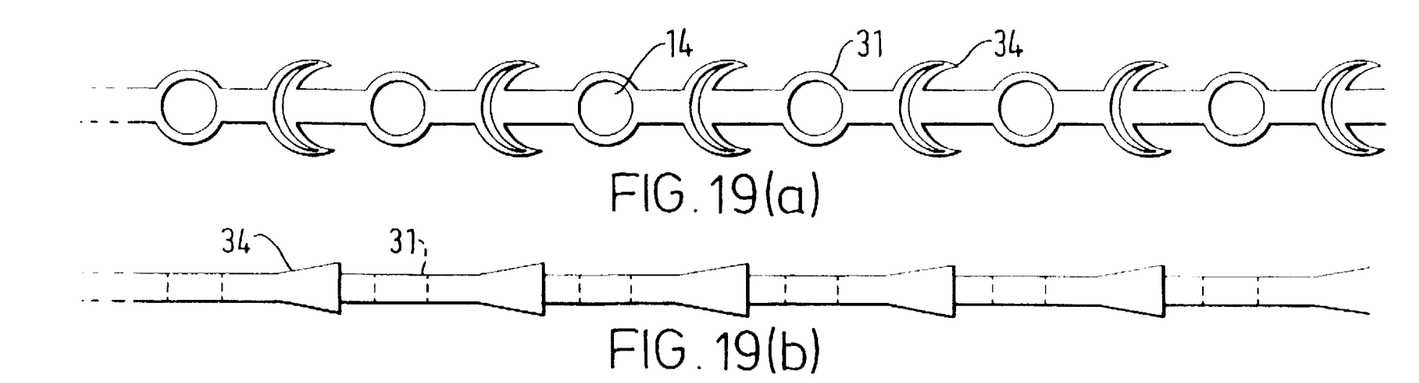
FIGS. 19(a) and 19(b) show respective plan and side elevational views of a tie strip according to an eighth embodiment of the present invention.

FIGS. 19(a) and (b) and 20(a) and (b) show tie strips having portions 31 defining apertures provided separately from portions 34 which define latch members and also provide spring portions. The structure of these portions will be self-evident from the drawings.

Figure 20A:
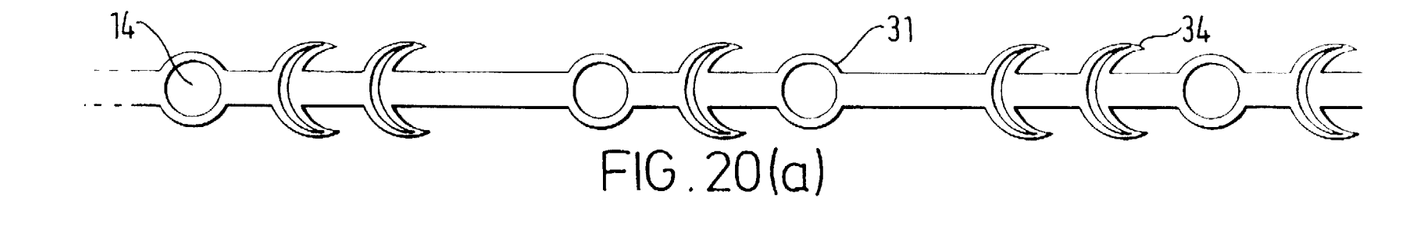
FIGS. 20(a) and 20(b) show respective plan and side elevational views of a tie strip according to a ninth embodiment of the present invention.
Figure 20B:
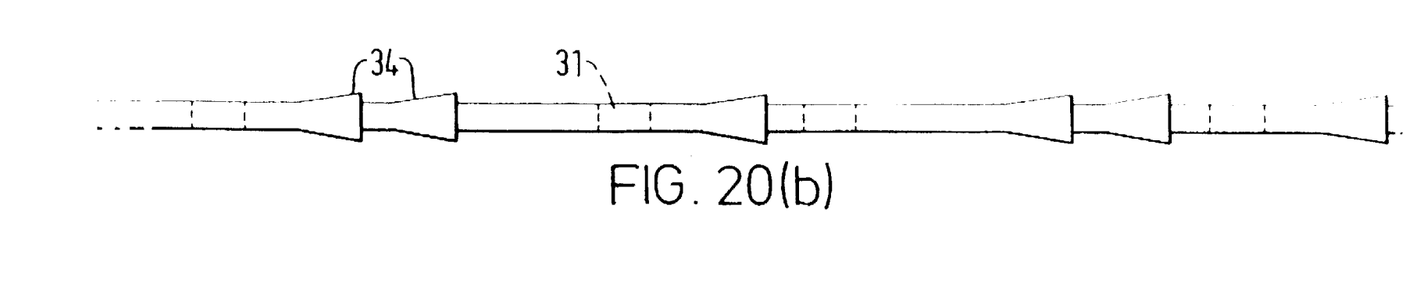

FIGS. 19(a) and 19(b) show a regular sequence of such portions 31 and 34 and FIG. 20(a) and (b) show an irregular sequence of such portions.

Figure 21A:
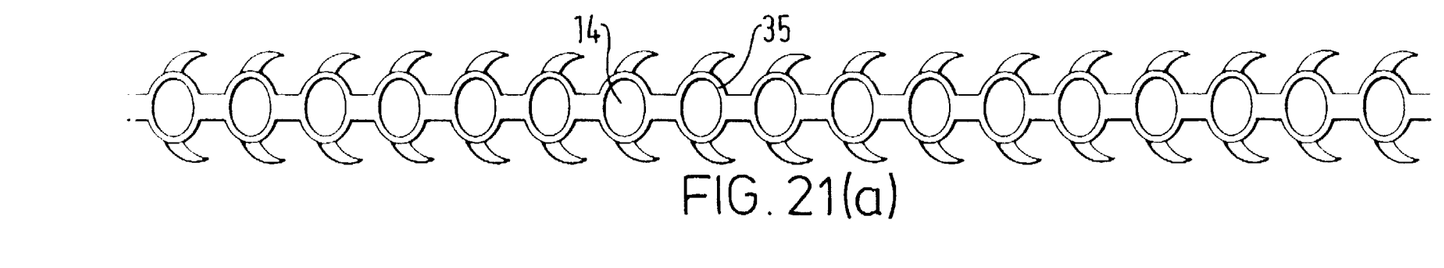
FIGS. 21(a) and 21(b) show respective plan and side elevational views of a tie strip according to a tenth embodiment of the present invention.
Figure 21B:
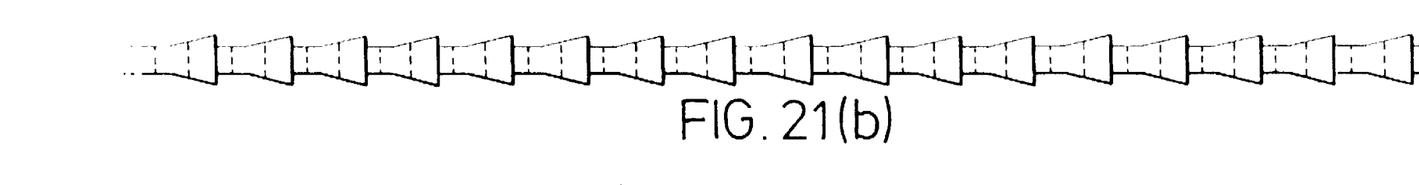
Figure 22A:
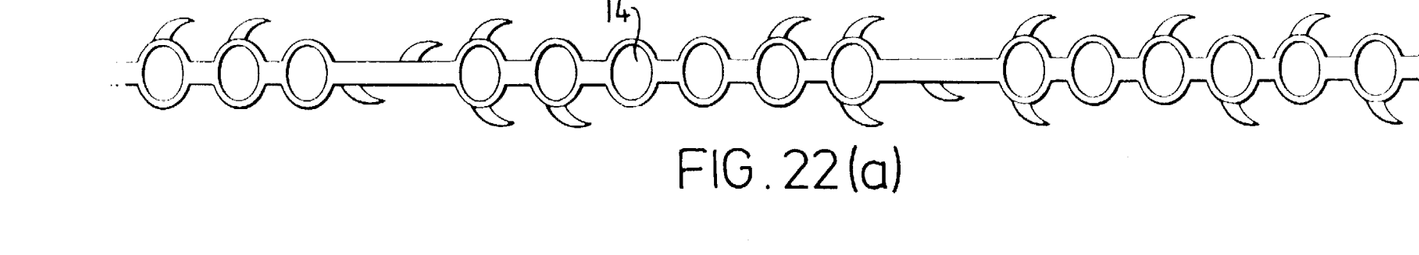
FIGS. 22(a) and 22(b) show respective plan and side elevational views of a tie strip according to an eleventh embodiment of the present invention.
Figure 22B:
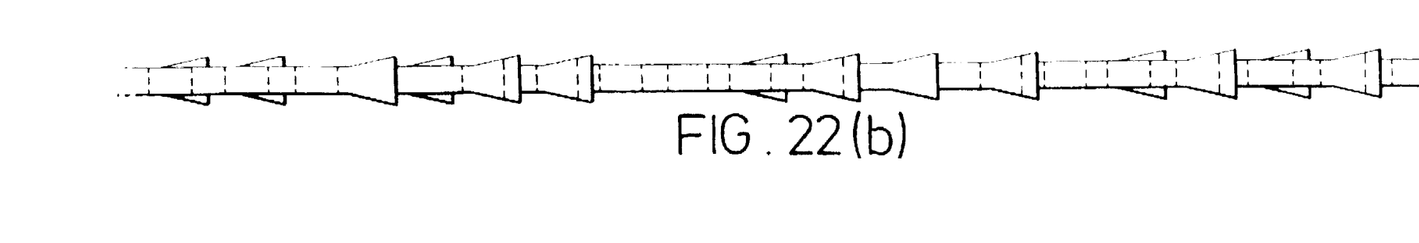

Tie strips having portions 35, which define apertures and provide spring portions, provided separately from portions 32 defining barb-like latch members, are shown in FIGS. 21(a) and (b) and 22(a) and (b). The structure of these tie strips will be readily apparent from the drawings.

The tie strips shown in FIGS. 15 to 22 can be used in substantially the same manner as that described above with reference to FIGS. 10 and 11.

I claim:

1. An integrally formed tie strip, made of a semi-rigid resiliently bendable material, comprising a series of unit cell portions connected one to the next along the strip, each of the said unit cell portions being formed to define at least one latch member projecting laterally of the strip's longitudinal axis, and to define an aperture through the strip, characterized in that the aperture of each unit cell portion is bounded on at least one side by a spring portion formed by parts of the strip that extend transversely with respect to the said longitudinal axis, the spring portion being resiliently deformable so as to enable the shape of the aperture to be changed, wherein a first unit cell portion of the strip can be passed through the aperture of a second unit cell portion of the strip so as to form a closed loop by way of the spring portion of the first and/or the second unit cell portion being bendingly deformed such that the shape of the aperture of the first and/or the second unit cell portion is respectively changed to a non-affine shape upon relative passage of the unit cell portions, and wherein the spring portion of the first and/or the second unit cell portion relaxes after said passage so that the at least one latch member of the said first unit cell portion inhibits withdrawal thereof from the aperture of the said second unit cell portion.

2. A strip as claimed in claim 1, wherein each of the said unit cell portions is generally cardioid in form and includes an aperture of similar shape, when the strip is free of longitudinal tension, having at one end thereof a re-entrant part and having at the other end thereof an apical part connected, except at one end of the strip, to a central region of the re-entrant part of the next unit cell portion in the series, whereby the latch members are respective lobe portions of each unit cell portion, which lobe portions are located to opposite sides of the said central region of the unit cell portion.

3. A strip as claimed in claim 2 wherein each of the said unit cell portions is formed so that one of them can be passed through another of them without any twisting of the strip about its longitudinal axis.

4. An integrally formed tie strip, made of a semi-rigid resiliently bendable material, comprising a series of unit cell portions connected one to the next along the strip, each of the said unit cell portions being formed to define at least one latch member projecting laterally of the strip's longitudinal axis, and to define an aperture through the strip, characterized in that the aperture of each unit cell portion is bounded on at least one side by a spring portion formed by parts of the strip that extend transversely with respect to the said longitudinal axis, the spring portion being resiliently deformable so as to enable the shape of the aperture to be changed, wherein a first unit cell portion of the strip can be passed through the aperture of a second unit cell portion of the strip so as to form a closed loop by way of the spring portion of the first and/or the second unit cell portion being deformed such that the shape of the aperture of the first and/or the second unit cell portion is respectively changed to a non-affine shape upon relative passage of the unit cell portions, and wherein the spring portion of the first and/or the second unit cell portion relaxes after said passage so that the at least one latch member of the said first unit cell portion inhibits withdrawal thereof from the aperture of the said second unit cell portion and wherein each of the said unit cell portions has the general form of an isosceles triangle having three sides, one of the sides being a base, the base having a base angle formed with each of said other two sides, and includes an aperture of similar shape, a midportion of each of the three sides of which is displaced inwardly of the triangle so as to be concave outwardly thereof when the strip is free of longitudinal tension, the apex of each of the said unit cell portions, except that at one end of the strip, being connected to the mid-point of the base of the next unit cell portion of the series, whereby respective portions of the triangle adjacent to the base angles thereof provide respective latch members that are bar-like in form.

5. A strip as claimed in claim 4, wherein the aperture of each of the said unit cell portions in a relaxed condition thereof, has a relatively narrow portion within each of its two latch members.

6. A strip as claimed in claim 4, wherein the aperture of each of the said unit cell portions in a relaxed condition thereof, has such a relatively narrow portion within each of its two latch members.

7. A strip as claimed in claim 4 wherein each of the said unit cell portions is formed so that one of them can be passed through another of them without any twisting of the strip about its longitudinal axis.

8. An integrally formed tie strip, made of a semi-rigid resiliently bendable material, comprising a series of unit cell portions connected one to the next along the strip, each of the said unit cell portions being formed to define at least one latch member projecting laterally of the strip's longitudinal axis, and to define an aperture through the strip, characterized in that the aperture of each unit cell portion is bounded on at least one side by a spring portion formed by parts of the strip that extend transversely with respect to the said longitudinal axis, the spring portion being resiliently deformable so as to enable the shape of the aperture to be changed, wherein a first unit cell portion of the strip can be passed through the aperture of a second unit cell portion of the strip so as to form a closed loop by way of the spring portion of the first and/or the second unit cell portion being deformed such that the shape of the aperture of the first and/or the second unit cell portion is respectively changed to a non-affine shape upon relative passage of the unit cell portions, and wherein the spring portion of the first and/or the second unit cell portion relaxes after said passage so that the at least one latch member of the said first unit cell portion inhibits withdrawal thereof from the aperture of the said second unit cell portion and wherein each of the said unit cell portions is generally cardioid in form and includes an aperture of similar shape, when the strip is free of longitudinal tension, having at one end thereof a reentrant part and having at the other end thereof an apical part connected, except at one end of the strip, to a central region of the re-entrant part of the next unit cell portion in the series, whereby the latch members are respective lobe portions of each unit cell portion, which lobe portions are located to opposite sides of the said central region of the unit cell portion and wherein the aperture of each of the said unit cell portions, in a relaxed condition thereof, has a relatively narrow portion within each of its two latch members.

9. A strip as claimed in claim 8 wherein each of the said unit cell portions is formed so that one of them can be passed through another of them without any twisting of the strip about its longitudinal axis.

10. An integrally formed tie strip, made of a semi-rigid resiliently bendable material, comprising a series of unit cell portions connected one to the next along the strip, each of the said unit cell portions being formed to define at least one latch member projecting laterally of the strip's longitudinal axis, and to define an aperture through the strip, characterized in that the aperture of each unit cell portion is bounded on at least one side by a spring portion formed by parts of the strip that extend transversely with respect to the said longitudinal axis, the spring portion being resiliently deformable so as to enable the shape of the aperture to be changed, wherein a first unit cell portion of the strip can be passed through the aperture of a second unit cell portion of the strip so as to form a closed loop by way of the spring portion of the first and/or the second unit cell portion being bendingly deformed such that the shape of the aperture of the first and/or the second unit cell portion is respectively changed to a non-affine shape upon relative passage of the unit cell portions, wherein the spring portion of the first and/or the second unit cell portion relaxes after said passage so that the at least one latch member of the said first unit cell portion inhibits withdrawal thereof from the aperture of the said second unit cell portion, and wherein the spring portion is curved when the first and/or the second unit cell portion relaxes.

* * * * *